(12) United States Patent
McCarthy et al.

(10) Patent No.: US 11,638,842 B2
(45) Date of Patent: May 2, 2023

(54) PORTABLE ELECTRIC RESCUE TOOL

(71) Applicant: Snap-on Incorporated, Kenosha, WI (US)

(72) Inventors: Ryan D. McCarthy, Hoboken, NJ (US); Bruce R. Modick, Boonton, NJ (US); John D. McCarthy, West Milford, NJ (US); Robert J. Barry, Port Murray, NJ (US)

(73) Assignee: Snap-on Incorporated, Kenosha, WI (US)

( * ) Notice: Subject to any disclaimer, the term of this patent is extended or adjusted under 35 U.S.C. 154(b) by 154 days.

(21) Appl. No.: 17/079,808

(22) Filed: Oct. 26, 2020

(65) Prior Publication Data

US 2022/0126122 A1    Apr. 28, 2022

(51) Int. Cl.
*A62B 3/00* (2006.01)
*B25F 5/02* (2006.01)

(52) U.S. Cl.
CPC ............... *A62B 3/005* (2013.01); *B25F 5/02* (2013.01)

(58) Field of Classification Search
CPC .................................. A62B 3/005; B25F 5/02
See application file for complete search history.

(56) References Cited

U.S. PATENT DOCUMENTS

| | | | |
|---|---|---|---|
| 3,536,976 A * | 10/1970 | Weidauercurt | H02P 7/293 318/443 |
| 4,392,263 A * | 7/1983 | Amoroso | A62B 3/005 72/464 |
| 5,002,135 A * | 3/1991 | Pellenc | A01G 3/037 30/228 |
| 5,272,811 A * | 12/1993 | Armand | B25B 33/00 30/228 |
| 5,297,780 A * | 3/1994 | Hickerson | A62B 3/005 72/705 |
| 5,368,106 A * | 11/1994 | Coughlin | A62B 3/005 169/70 |

(Continued)

FOREIGN PATENT DOCUMENTS

| | | |
|---|---|---|
| CN | 109716551 A | 5/2019 |
| WO | 94/07788 A1 | 4/1994 |
| WO | 2020128597 A | 6/2020 |

OTHER PUBLICATIONS

Combined Search and Examination Report for corresponding Application No. GB2114430.8 dated Mar. 29, 2022, 7 pages.

(Continued)

*Primary Examiner* — Nathaniel C Chukwurah
*Assistant Examiner* — Lucas E. A. Palmer
(74) *Attorney, Agent, or Firm* — Seyfarth Shaw LLP

(57) ABSTRACT

A portable electric rescue tool, such as spreader and cutter tool, that allows for manual or remote operation, and operates on a DC power source, which may be an external power source and/or an onboard rechargeable battery. For example, the tool includes a battery cradle or battery attachment portion adapted to removably receive a rechargeable battery pack and electrically couple the battery pack to the tool. The tool also includes a power adapter that is adapted to be removably coupled to the battery attachment portion instead of the battery pack, and allows the tool to be electrically connected to an external DC power source, such as a vehicle battery or other DC power source.

20 Claims, 9 Drawing Sheets

(56) References Cited

U.S. PATENT DOCUMENTS

| | | | | |
|---|---|---|---|---|
| 5,520,064 A * | 5/1996 | Hickerson | ............... | A62B 3/005 74/421 R |
| 5,544,862 A * | 8/1996 | Hickerson | ............... | A62B 3/005 72/705 |
| 5,642,566 A * | 7/1997 | Hirabayashi | ........... | H02G 1/005 30/247 |
| 6,178,643 B1 * | 1/2001 | Erbrick | ................... | B26B 15/00 30/92 |
| 7,293,362 B2 * | 11/2007 | Konen | ................. | B23D 29/002 30/388 |
| 9,339,938 B2 * | 5/2016 | Winkel | ................ | B23Q 15/007 |
| 10,307,621 B2 | 6/2019 | Hickerson | | |
| 2010/0064527 A1 * | 3/2010 | Lee | ........................ | A01G 3/037 30/228 |
| 2010/0325894 A1 * | 12/2010 | Scott | ......................... | B25F 3/00 30/92 |
| 2013/0219725 A1 * | 8/2013 | Winkel | ................ | B23Q 15/007 30/228 |
| 2014/0260504 A1 * | 9/2014 | Hickerson | ............. | A62B 3/005 72/449 |
| 2017/0252911 A1 * | 9/2017 | Barezzani | ............... | F04B 19/04 |
| 2017/0348554 A1 * | 12/2017 | Leca | ...................... | A62B 3/005 |
| 2017/0358909 A1 * | 12/2017 | Ballard | .................. | H02G 1/005 |
| 2018/0021603 A1 * | 1/2018 | Horne | ................... | A62B 3/005 254/93 R |
| 2018/0147713 A1 * | 5/2018 | Schmauder | ............... | B25F 5/02 |
| 2018/0311807 A1 * | 11/2018 | Sergyeyenko | ........ | H02J 7/0042 |
| 2019/0240513 A1 | 8/2019 | Hickerson | | |
| 2019/0240514 A1 | 8/2019 | Hickerson | | |

OTHER PUBLICATIONS

Taiwan Office Action for corresponding TW Application No. 110139450, dated Sep. 23, 2022, 9 pages.

Examination Report for corresponding Australian Application No. 2021236562 dated Jul. 4, 2022, 3 pages.

* cited by examiner

PORTABLE ELECTRIC RESCUE TOOL

TECHNICAL FIELD OF THE INVENTION

The present invention relates generally to portable rescue tools, and more particularly, to emergency portable spreader and cutter tools powered by a battery pack.

BACKGROUND OF THE INVENTION

Emergency rescue type tools are generally used by various rescue personnel such as police, fire fighting, and paramedic personnel to spread, open, or cut through metal layers of a vehicle, building, or other enclosure to extract trapped or injured persons. Pushing and pulling forces of 7,000 to 15,000 pounds at the tips of these tools are considered normal for the proper operation of such tools. To achieve such forces, these rescue tools typically are powered by hydraulics or combustion type engines. Such tools are costly, heavy, and have limited portability as they must be powered by nearby power supply devices (e.g., a hydraulic pump).

Recently, some rescue tools have been developed that are powered by electric power, such as described in U.S. Pat. No. 5,520,064, titled Portable Rescue Tool. This patent describes a rescue tool having a DC motor that operates on electric power and includes clutch, gear, and actuator mechanisms for providing high torque spreading and/or cutting motion. However, the electric rescue tool requires connection to an external DC power source, which limits the portability of the tool.

SUMMARY OF THE INVENTION

The present invention relates broadly to a portable electric emergency rescue tool, such as a spreader and cutter tool, that operates on a DC power source, which may be an external power source and/or an onboard battery, such as a rechargeable battery. For example, the tool includes a battery cradle or battery attachment portion adapted to receive a rechargeable battery pack and electrically couple the battery pack to the tool. The tool also includes a power adapter adapted to be removably coupled to the battery attachment portion instead of the battery pack, which allows the tool to be electrically coupled to an external DC power source, such as a 12V DC vehicle battery or other DC power source.

In other aspects, the tool may include a remote control removably or wirelessly couplable to the tool to allow the tool to be operated remotely instead of manually. Thus, an operator can operate the tool manually or remotely as the situation requires. For example, certain situations can be dangerous and unstable, and may require the operator to be in an unsafe location in order to manually operate the tool. The remote operation allows an operator to remain in a safe location, away from danger.

In an embodiment, the present invention broadly comprises a portable rescue tool having first and second operable jaws. The tool includes a housing, a battery adapted to removably couple to the housing and provide power, and a motor is disposed in the housing. In an embodiment, the motor is adapted to run on DC power via the battery, and provide output torque. A gear assembly is disposed in the housing and is operably coupled to the motor. The gear assembly is adapted to receive the output torque from the motor. An actuator assembly is also operably coupled to the gear assembly and adapted to receive output torque from the gear assembly, and to operate the jaws.

In another embodiment, the present invention broadly comprises a portable rescue tool with first and second jaws. The tool includes a housing, a battery adapted to removably couple to the housing, a power adapter adapted to removably couple to the housing when the battery is removed from the housing and electrically couple to an external power source. A motor is disposed in the housing, and the motor is adapted to receive power and provide output torque. In an embodiment, the power is 12V DC. A gear assembly is disposed in the housing and operably coupled to the motor. The gear assembly is adapted to receive the output torque from the motor. An actuator assembly is also operably coupled to the gear assembly and adapted to receive output torque from the gear assembly, and operate the jaws.

In another embodiment, the present invention relates to a portable rescue tool with first and second jaws. The tool includes a housing, a battery adapted to removably couple to the housing and provide power, and a motor disposed in the housing. The motor is adapted to receive power via the battery, and provide output torque. A gear assembly is disposed in the housing and operably coupled to the motor. The gear assembly is adapted to receive the output torque from the motor. An actuator assembly is operably coupled to the gear assembly and adapted to receive output torque from the gear assembly, and to operate the jaws. In this embodiment, the tool also includes a remote control connection port disposed on the housing and adapted to operably couple to a remote control adapted to operate the tool remotely. The remote control can be coupled wirelessly or via a communication wire.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

Figure 1:
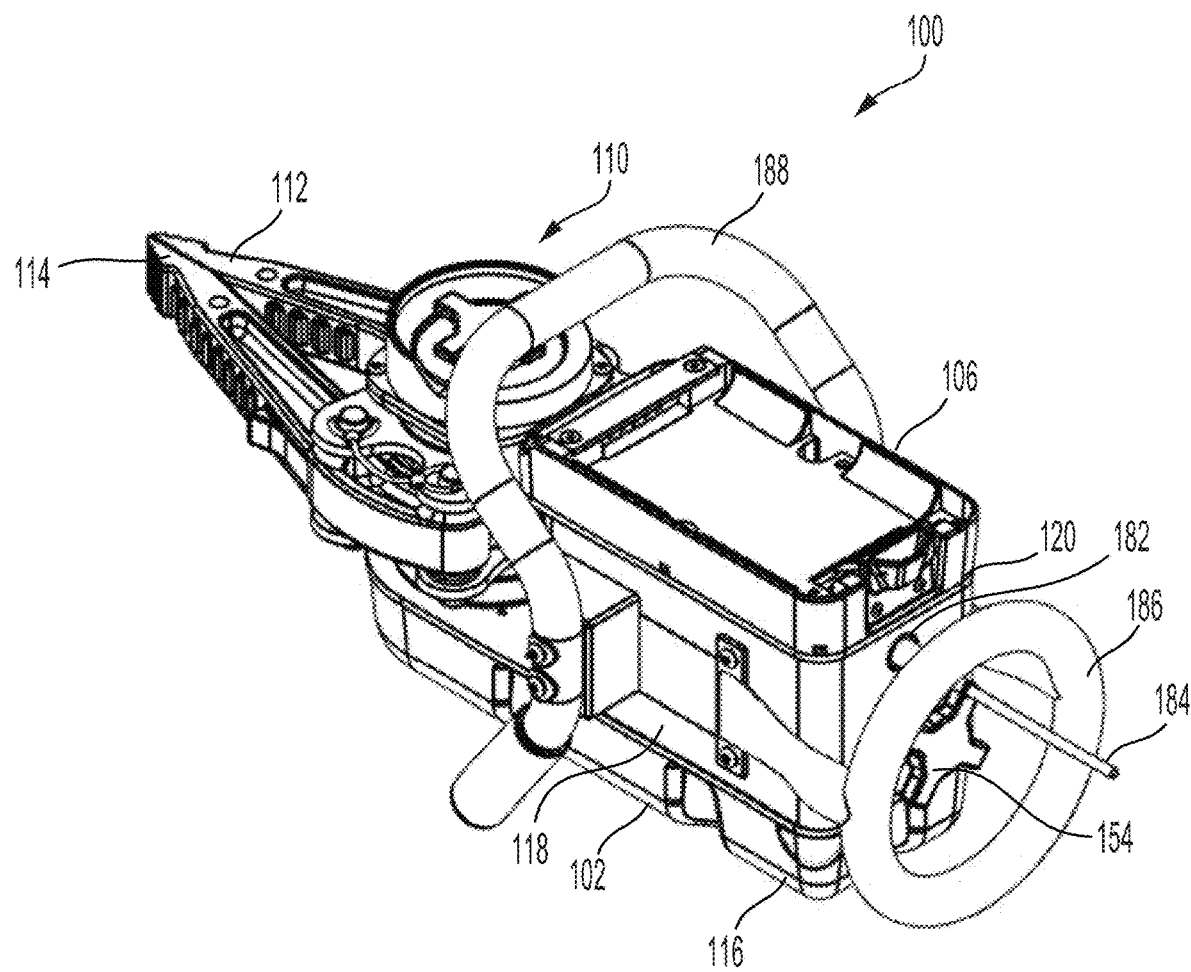
FIG. 1 is a perspective view of a tool, according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to a portable electric rescue tool, such as spreader and cutter tool, that operates on a power source, which may be an external power source and/or an onboard rechargeable battery. In an embodiment, the tool operates on DC power. For example, the tool includes a battery cradle or battery attachment portion adapted to removably receive a rechargeable battery pack and electrically couple the battery pack to the tool. The tool also includes a power adapter that is adapted to be removably coupled to the battery attachment portion instead of the battery pack, and allows the tool to be electrically connected to an external power source, such as a vehicle battery or other power source.

In other aspects, the tool may include a remote control removably coupleable to the tool to allow the tool to be operated remotely instead of manually. The remote control can be operably coupled to the tool wireless or with a communication wire. Thus, an operator can operate the tool manually or remotely as the situation requires. For example, certain situations can be dangerous and unstable, and may require the operator to be in an unsafe location in order to manually operate the tool. Remote operation allows an operator to remain in a safe location, away from danger.

Figure 2:
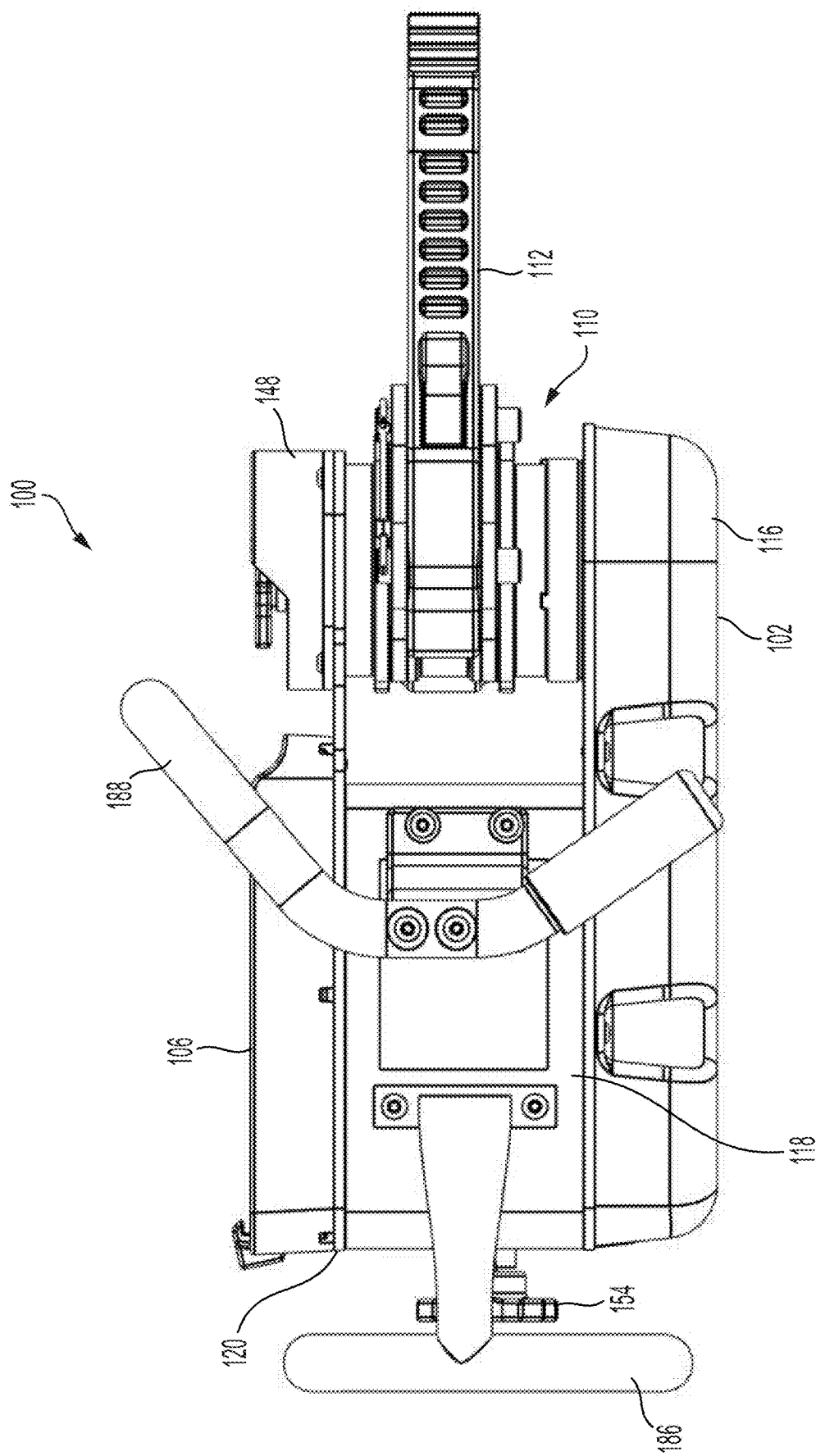
FIG. 2 is a side view of the tool of FIG. 1, according to an embodiment of the present invention.
Figure 3:
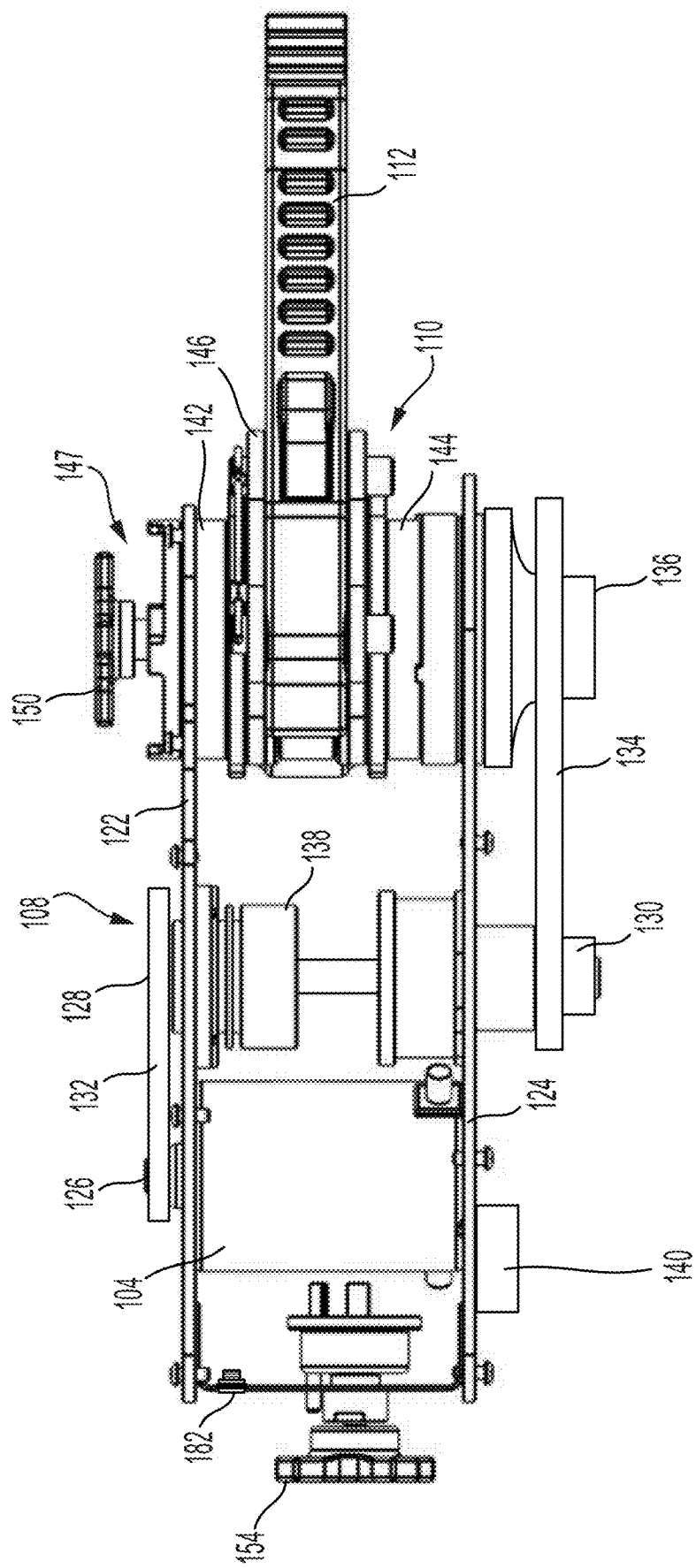
FIG. 3 is a side view of the tool of FIG. 1 with the housing removed, according to an embodiment of the present invention.

Referring to FIGS. 1-3, a tool 100, such as a spreader and cutter rescue tool, is illustrated. The tool 100 includes a tool housing 102, a motor 104 disposed in the tool housing 102, a battery attachment portion 106 adapted to receive a battery and/or a power adapter, a gear assembly 108 disposed in the tool housing 102 and operably coupled to the motor 104, an actuator assembly 110 operably coupled to the gear assembly 108, and first and second jaws 112, 114, such as spreader and cutter type jaws, operably coupled to the actuator assembly 110. The tool housing 102 may include a first portion 116 adapted to at least partially cover a bottom portion of the tool 100, a second portion 118 adapted to at least partially cover a middle section or sides of the tool 100, and a third portion 120, which may include the battery attachment portion 106, and that is adapted to at least partially cover a top portion of the tool 100.

The tool housing 100 may also include a first (upper) plate 122 and a second (lower) plate 124 that are disposed substantially parallel to each other and extend longitudinally along the tool 100. One or both of the first and second plates 122, 124 include one or more cutouts adapted to receive and mate with the motor 104, gear assembly 108, and actuator assembly 110 to couple the motor 104, gear assembly 108, and actuator assembly 110 to the tool housing 102. The first and second plates 122, 124 may also be coupled together via one or more spacers to provide strength and rigidity to the tool 100. The first portion 116 of the tool housing 102 may also be coupled to the second plate 124, the second portion 118 may be coupled to one or both of the first and second plates 122, 124, and the third portion 120 (including the battery attachment portion 106) may be coupled to the first plate 122.

The motor 104 disposed in the tool housing 102, is an electric DC motor. For example, the motor 104 may be any type of DC electric motor, such as a brushed or brushless type DC motor. In an example, the motor 104 is a self-contained electric motor having an output sprocket and rotor shaft 126. The motor 104 receives input power directly or indirectly (via a controller assembly 140, as described in further detail below) from a battery pack or power adapter coupled to an external power source. In an embodiment, the motor 104 operates on 12V DC power. In another embodiment, the motor 104 operates on 14.4V DC power. In further embodiments, the motor 104 may operate on any voltage DC power. For example, the motor 104 may operate on any voltage, such as 6V to 60V, including 12V, 15V, 18V, 28V, 48V, 60V, etc.

The gear assembly 108 and actuator assembly 110 may be similar to those described in U.S. Pat. No. 5,520,064, titled Portable Rescue Tool, which is incorporated herein by reference in its entirety. For example, the gear assembly 110 may include input and output sprockets 128, 130. The input sprocket 128 is adapted to receive output speed and torque from the motor 104 via a first belt or chain 132 operably coupling the output sprocket and rotor shaft 126 of the motor 104 to the input sprocket 128 of the gear assembly 108. The output sprocket 130 is adapted to provide output speed and torque from the gear assembly 108 to the actuator assembly 110 via a second belt or chain 134 operably coupling the output sprocket 130 of the gear assembly 108 to an input sprocket 136 of the actuator assembly 110. The gear assembly 108 is adapted to decrease speed and increase torque of the motor output.

The gear assembly 108 may also include a brake assembly 138, which may be a fail-safe, electrically-off brake connected in parallel across the terminals of the motor 104. Thus, when the motor 104 is not provided with DC power, the brake assembly 138 is engaged, and when the motor 104 is provided with DC power, the brake assembly 138 is disengaged.

The actuator assembly 110 includes the input sprocket 136, and a second gear assembly adapted to decrease speed and increase torque output from the gear assembly 108. As described above, the second chain 134 operatively couples the output sprocket 130 of the gear assembly 108 and the input sprocket 136 of the actuator assembly 110. Similar to the gear assembly described in U.S. Pat. No. 5,520,064, the second gear assembly includes a shaft onto which the input sprocket 136 is mounted, a sun gear spline coupled to the splined shaft, planet gears operably coupled to the sun gear, planet shafts respectively corresponding to and associated with the planet gears, a splined gear carrier operatively engaged with the planet shafts, a sun gear operably coupled to the splined gear carrier, spindle gears operably coupled to the sun gear, first and second (upper and lower) fixed ring gears 142, 144 operably coupled to the spindle gears and having fixed ring gear lugs formed as a part thereof, and a movable ring gear 146 operably coupled to the spindle gears and having movable ring gear lugs formed as a part thereof. The first and second jaws 112, 114 (such as spreading and/or cutting arms) are coupled to the movable ring gear lugs of the ring gear 146 and the fixed ring gear lugs of the ring gears 142, 144 to perform rescue tool functions (e.g., cutting or spreading). In an example, the total gear reduction from the output of the motor 104 to the output of the actuator assembly 110 (i.e. the opening or the closing motion of the spreading and/or cutting arms) is typically 6000:1, thus providing significant force or power for the rescue tool functions.

The actuator assembly 110 may be rotatably coupled to the first and second plates 122, 124 with a snap ring or retaining rings, respectively. A clutch mechanism 147 may be utilized to selectively orient and mount the actuator assembly 110 in any one of multiple positions on the first and second plates 122, 124. The clutch mechanism may be similar to that described in U.S. Pat. No. 5,520,064, titled Portable Rescue Tool, or U.S. Pat. No. 10,307,621, titled Portable Rescue Tool, which are both incorporated herein by reference in their entirety. For example, such a clutch mechanism 147 may include a clutch housing 148 (as shown in FIG. 2) and a clutch handle 150 (as shown in FIG. 3). The clutch housing 148 is coupled to the first plate 122, and a first friction disk may be coupled to the clutch housing 148. A second friction disk can be disposed directly beneath the first friction disk, and may be keyed to the actuator assembly 110 through the first fixed ring gear 142. A third friction disk can be disposed beneath the second friction disk and rests upon a spacer. The spacer may be biased upwardly against the third friction disk by a bias device, such as a spring, which is supported by a threaded shaft. The threaded shaft passes through a center of the clutch housing 148 and engages the clutch handle 150. Thus, the second friction disk, and hence the first fixed ring gear 142, and the entire actuator assembly 110, may be fixed in a desired position by tightening the second friction disk between the first and second friction disks and by tightening the clutch handle 150 down along the threaded shaft.

The actuator assembly 110 may also be repositioned, with respect to the first and second plates 122, 124, by loosening the clutch handle 150 up along the threaded shaft, thereby relieving the frictional interactions between all of the friction disks and allowing the actuator assembly 110 to be rotated between the first and second plates 122, 124.

Figure 4:
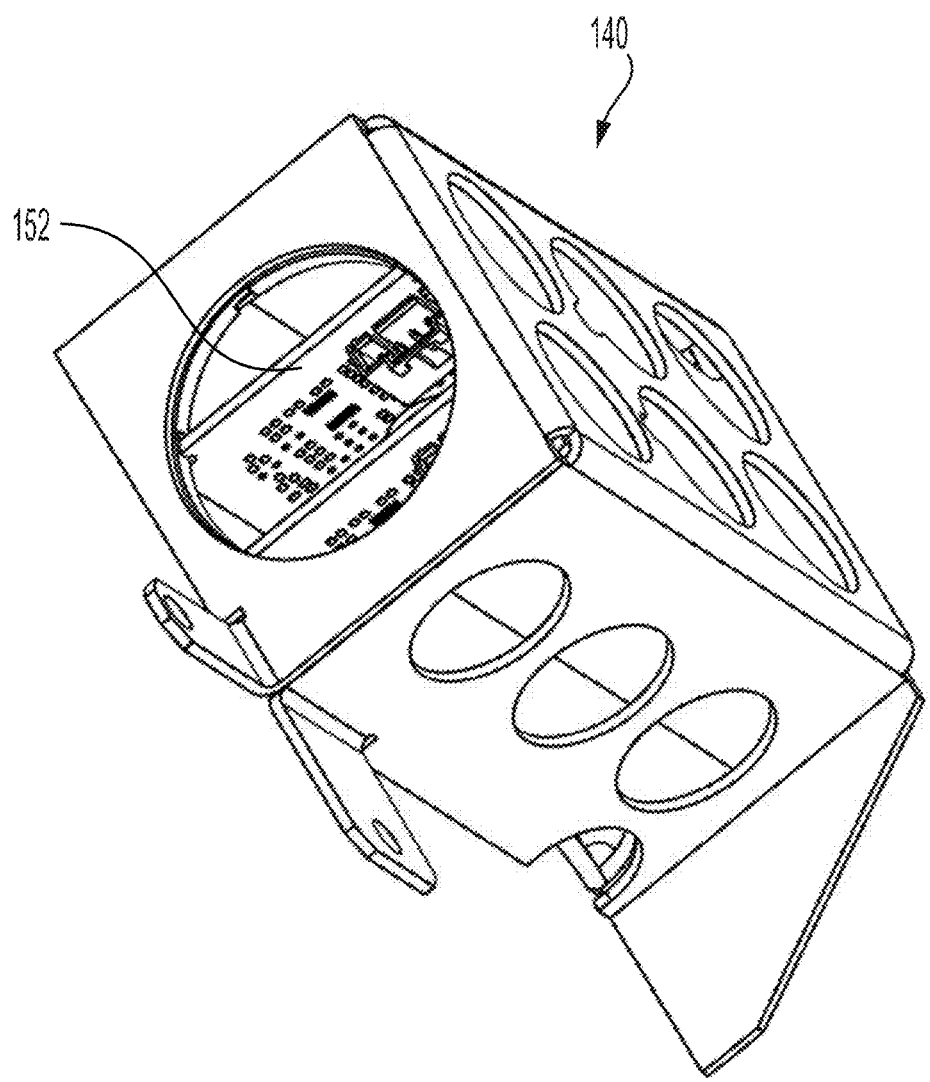
FIG. 4 is a perspective view of a controller assembly of the tool of FIG. 1, according to an embodiment of the present invention.

Referring to FIGS. 3 and 4, the tool 100 may also include a controller assembly 140, including one or more printed circuit boards (PCBs) 152. The controller assembly 140 may be disposed in the tool housing 102 and coupled to one or both of the first and second plates 122, 124. The controller assembly 140 (such as one or more of the PCBs 152) may be electrically coupled to electrical contacts exposed in the battery attachment portion 106. This provides for electrical coupling of a power source, such as a battery or power adapter disposed in the battery attachment portion 106, to the controller assembly 140. The controller assembly 140 (such as one or more of the PCBs 152) may also be electrically coupled to the motor 104 and the brake assembly 138. The controller assembly 140 (such as one or more of the PCBs 152) may also be operably coupled to a switch mechanism 154 of the tool 100. This allows the controller assembly 140 to control the supply of power to the motor 104, operation of the motor 104, supply of power to the brake assembly 138, and operation of the brake assembly 138.

Referring again to FIGS. 1-3, the switch mechanism 154 is coupled to the tool housing 102, and operably coupled to the controller assembly 140. The switch mechanism 154 is adapted to be used to select a mode of operation of the tool 100, such as, for example, opening or closing of the jaws 112, 114. The switch mechanism 154 operates by causing (or not causing) power to be supplied to the motor 104. Depending on the position of the switch mechanism 154, power is allowed to be supplied to the motor 104 and provide a high speed, low torque output selectively in one of two rotational directions. The switch mechanism 154 may be a three-position switch with a first position being a clockwise (CW) direction position, a second position being a counter-clockwise (CCW) direction position, and a third position being a neutral or off position.

The battery attachment portion 106 may be part of the tool housing 102, and be coupled to the first plate 122. The battery attachment portion 106 may include electrical contact terminals or an opening that exposes the electrical contact terminals. The electrical terminals are adapted to electrically couple to a power source, such as a battery pack or power adapter, disposed in the battery attachment portion 106.

Figure 5:
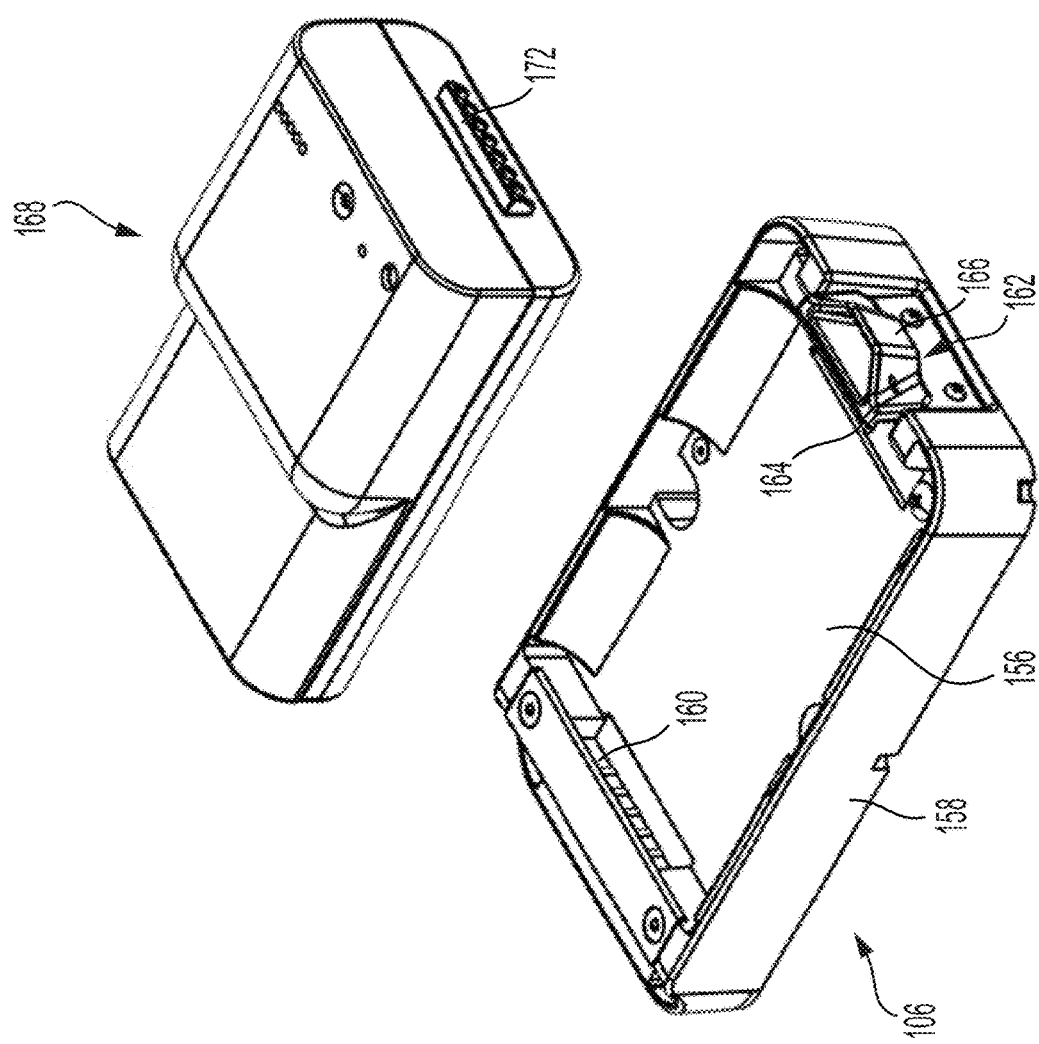
FIG. 5 is a perspective view of a battery attachment portion of the tool of FIG. 1 and an exemplary battery, according to an embodiment of the present invention.
Figure 6:
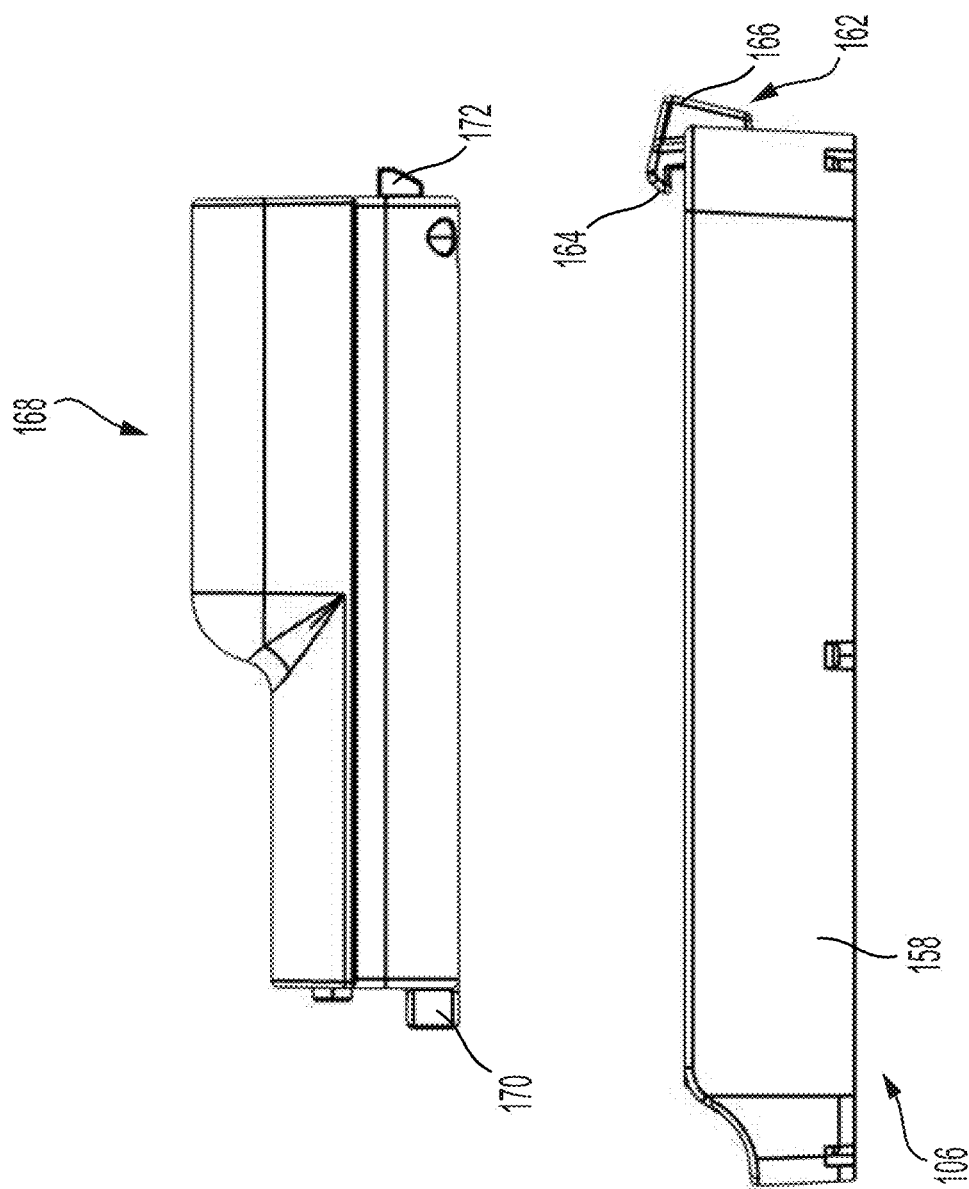
FIG. 6 is a side view of the battery attachment portion of the tool of FIG. 1 and the exemplary battery, according to an embodiment of the present invention.
Figure 7:
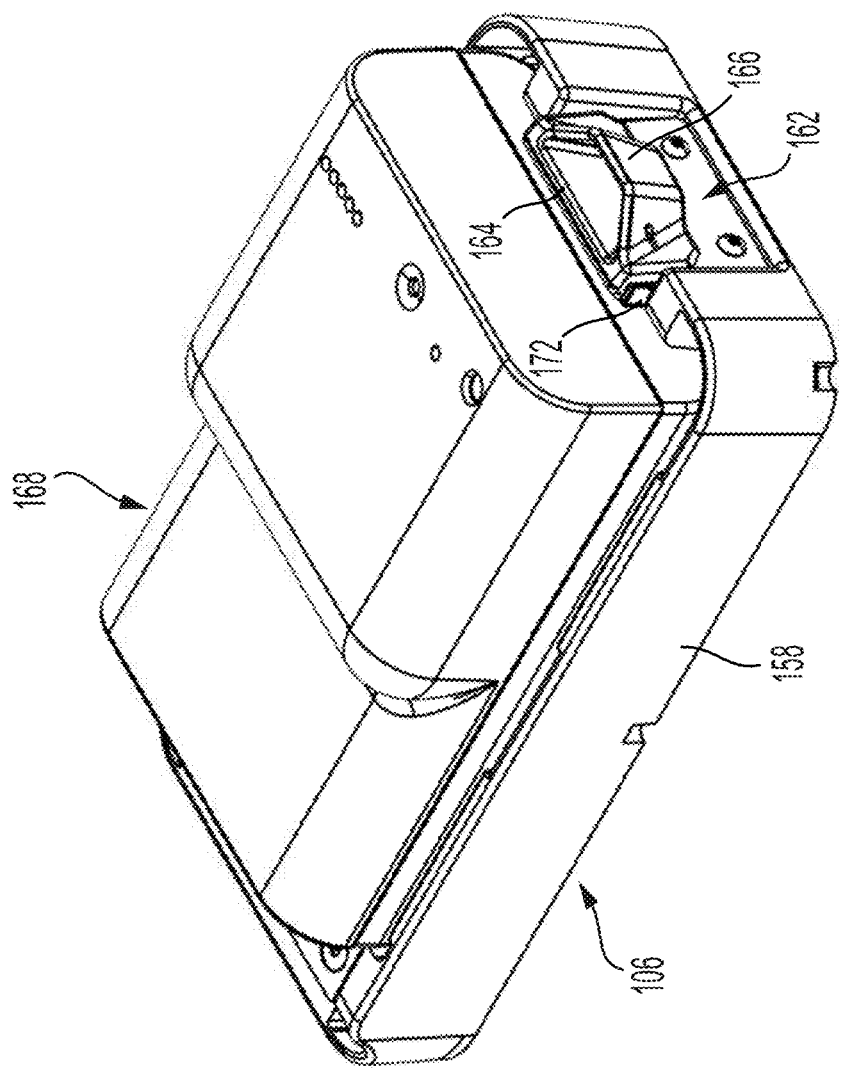
FIG. 7 is a perspective view of the exemplary battery disposed in the battery attachment portion, according to an embodiment of the present invention.
Figure 8:
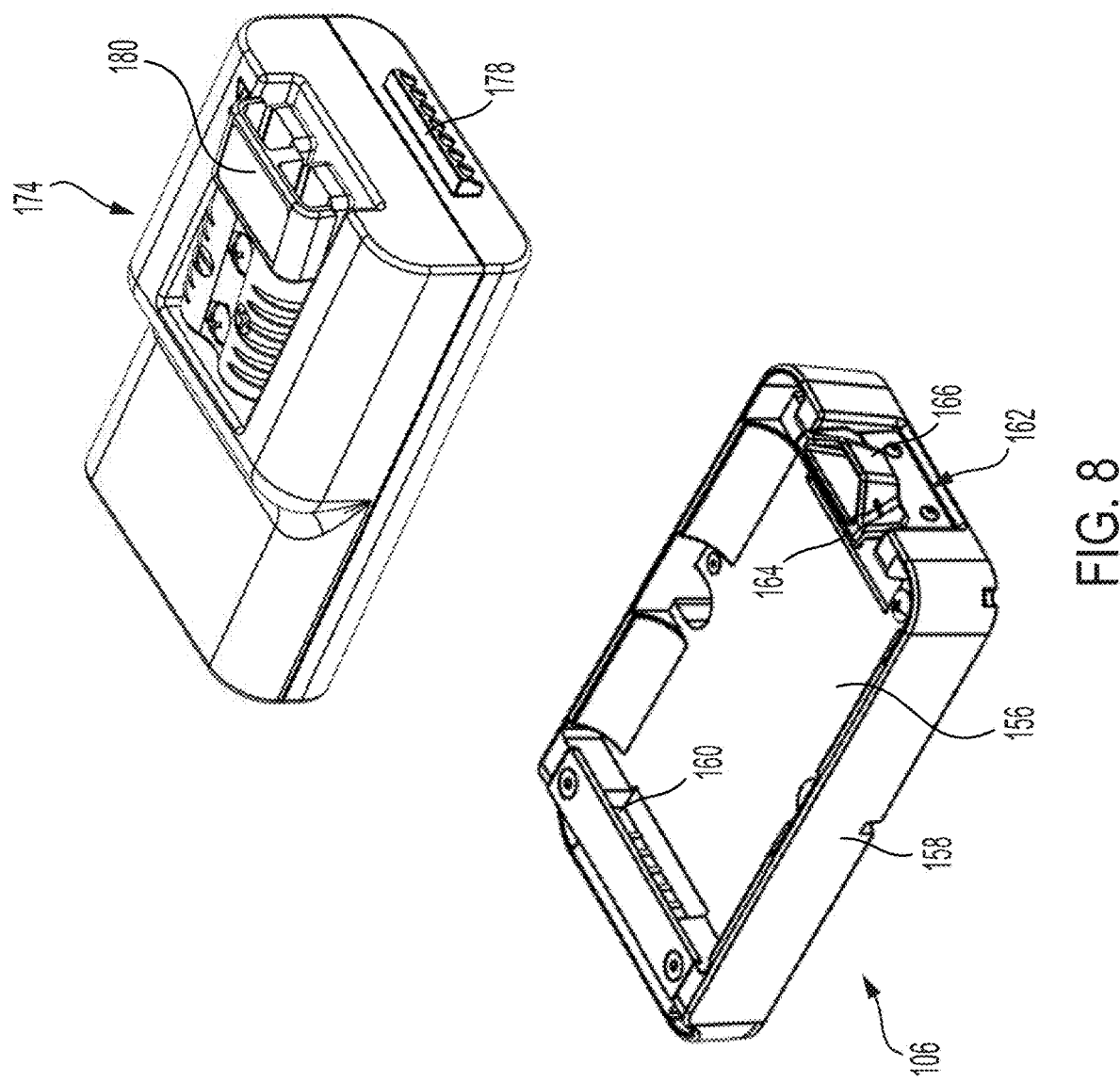
FIG. 8 is a perspective view of a battery attachment portion of the tool of FIG. 1 and an exemplary power adapter, according to an embodiment of the present invention.
Figure 9:
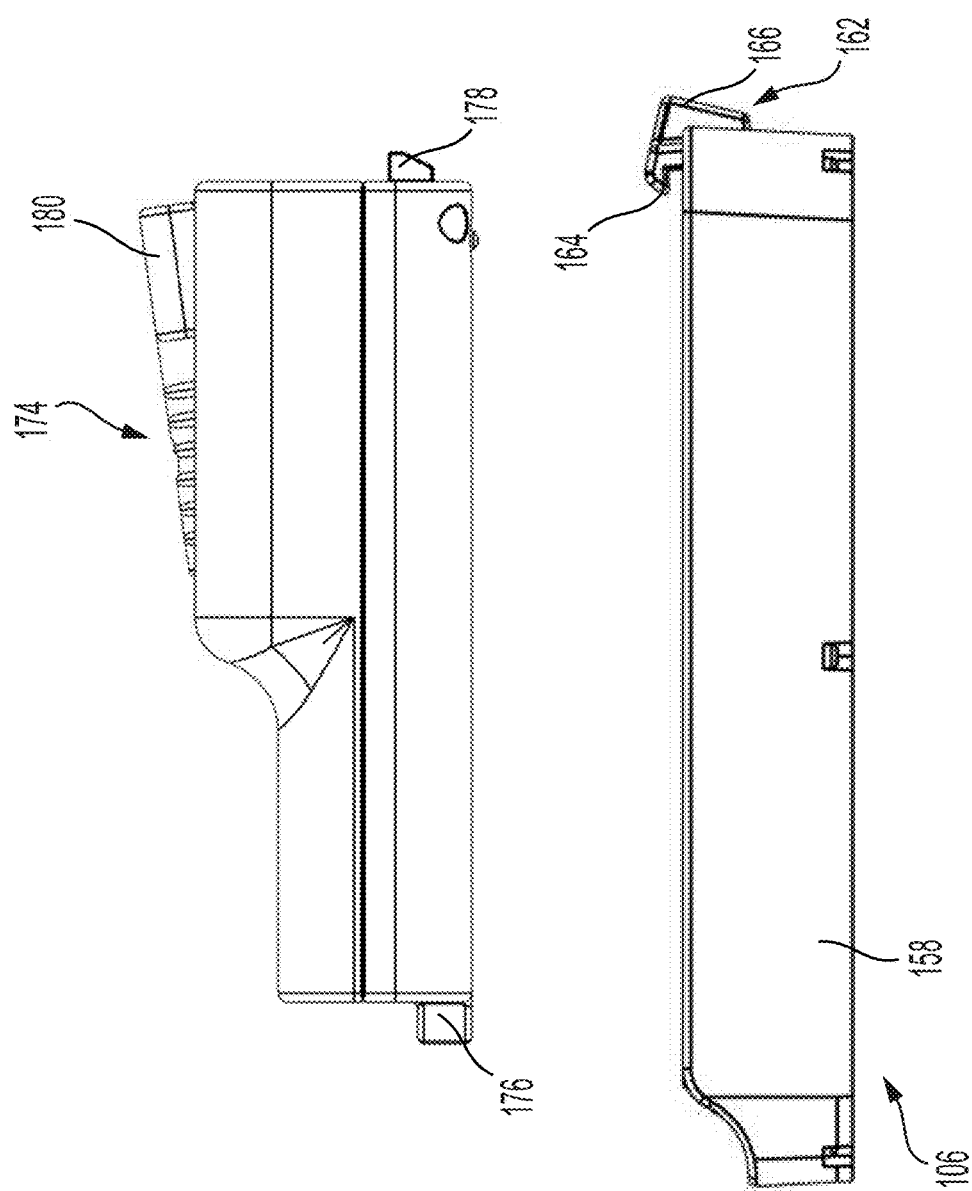
FIG. 9 is a side view of the battery attachment portion of the tool of FIG. 1 and the exemplary power adapter, according to an embodiment of the present invention.

Referring to FIGS. 5-7, the battery attachment portion 106 includes a base portion 156 with side walls 158. A groove 160 may be formed in one side of the battery attachment portion 106, and a latch 162 may be disposed on an opposite side. The latch 162 may include a protrusion 164 that projects inwardly into the battery attachment portion 106, and a handle 166 operably coupled to the protrusion 164. In an example, depression of the handle 166 causes the protrusion to move outwardly and away from the battery attachment portion 106 to allow removal of a battery pack or power adapter from the battery attachment portion 106.

The tool 100 may include a battery pack, such as battery pack 168 with electrical contacts adapted to electrically couple to the electrical contacts exposed in the battery attachment portion 106. As illustrated, the battery pack 168 may include a first projection 170 extending from a first end of the battery pack 168, and a second projection 172 extending from a second opposing end of the battery pack 168. The battery pack may be disposed or installed in the battery attachment portion 106 by inserting the first projection 170 into the groove 160 and pushing the battery pack 168 downwards into the battery attachment portion 106 causing the second projection 172 to be disposed underneath the protrusion 164 of the latch 162, as shown in FIG. 7. When the battery pack 168 is disposed in the battery attachment portion 106, the electrical contacts of the battery pack 168 electrically couple to the electrical contacts exposed in the battery attachment portion 106. In an embodiment, the battery pack 168 may be a 12V DC rechargeable type of battery pack and include one or more battery cells. In other embodiments, the battery pack 168 may provide any desired voltage. For example, the battery pack 168 may provide any voltage, such as 6V to 60V, including 12V, 14.4V, 15V, 18V, 28V, 48V, 60V, etc. The battery pack 168 may also be any type of battery pack, including a lead-acid, zinc-air, nickel-cadmium (NiCd), nickel-metal hydride (NiMH), lithium-ion (Li-ion), Lithium Iron Phosphate (LiFePO4), and/or lithium-ion polymer (Li-ion polymer) type battery pack.

When the battery pack 168 is removed from the battery attachment portion 106, a power adapter 174 may be disposed in the battery attachment portion 106. The power adapter 174 includes similar features as the battery pack 164 to allow the power adapter 174 to be disposed in and coupled to the battery attachment portion 106. For example, the power adapter 174 may include electrical contacts adapted to electrically couple to the electrical contacts exposed in the battery attachment portion 106. The power adapter 174 also includes a first projection 176 extending from a first end of the power adapter 174, and a second projection 178 extending from a second opposing end of the power adapter 174. The power adapter 174 may be disposed or installed in the battery attachment portion 106 by inserting the first projection 176 into the groove 160 and pushing the power adapter 174 downwards into the battery attachment portion 106 causing the second projection 178 to be disposed underneath the protrusion 164 of the latch 162. When the power adapter 174 is disposed in the battery attachment portion 106, the electrical contacts of the power adapter 174 electrically couple to the electrical contacts exposed in the battery attachment portion 106.

The power adapter 174 may also include power connection terminals 180 adapted to receive a power cord that is attachable to an external power source, such as an external battery or other power source. In an example, the external power source may be a 12V battery, such as a vehicle battery. In an embodiment, since the tool 100 can be configured for 12V DC, the tool 100 to be used anywhere a 12V DC power source is located, which is generally part of most vehicles. In other embodiments, the tool 100 can be configured for any desired voltage. For example, the tool 100 may operate on any voltage, such as 6V to 60V, including 12V, 14.4V, 15V, 18V, 28V, 48V, 60V, etc. Thus, the external power source may be any voltage capable of operating the tool, such as 6V to 60V, including 12V, 14.4V, 15V, 18V, 28V, 48V, 60V, etc.

Referring back to FIG. 1, the tool 100 may also include a remote control connection port 182. The remote connection port 182 may be operably coupled to the controller assembly 140 (such as one or more of the PCBs 152). A remote control with a cord 184 may be operably coupled to the remote connection port 182 to allow the tool 100 to be operated remotely instead of manually with the switch mechanism 154. For example, the remote control coupled to the controller assembly 140 via the remote connection port 182 may be used instead of or in combination with the switch mechanism 154 to cause (or not allow) power to be supplied to the motor 104. In an embodiment, the tool 100 can include a transponder or transceiver to wirelessly communicate with a remote control. Like the switch mechanism 154, the remote control may provide a remote three-position switch with a first position being a clockwise (CW) direction position, a second position being a counter-clockwise (CCW) direction position, and a third position being a neutral or off position.

Referring again to FIG. 1, the tool may also include first and second handles 186, 188 coupled to the tool housing 102 to allow for manual operation of the tool 100. During manual operation, a user may hold or grasp the tool 100 via the first and second handles 186, 188, and control operation of the tool 100 via the switch mechanism 154. Alternately, or in addition to manual operation, the tool 100 may be operated remotely. During remote operation, the remote control may be operably coupled to the remote connection port 182, and a user may control operation of the tool 100 via the remote control. For example, certain situations can be dangerous and unstable, and may require the user/operator to be in an unsafe location in order to manually operate the tool. This remote operation allows an operator to remain in a safe location, away from danger.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool with first and second jaws, the tool comprising:
   a housing including electrical contacts;
   first and second handles coupled to the housing;
   a battery adapted to removably couple to the housing substantially between the first and second handles and electrically couple to the electrical contacts;
   a power adapter adapted to removably couple to the housing and electrically couple to the electrical contacts when the battery is removed from the housing, and supply power from an external power source;
   a motor disposed in the housing, the motor is adapted to receive power from the battery or the power adapter, and provide output torque;
   a gear assembly disposed in the housing and operably coupled to the motor, the gear assembly is adapted to receive the output torque from the motor; and
   an actuator assembly operably coupled to the gear assembly and adapted to receive output torque from the gear assembly, and provide torque to operate the jaws.

2. The tool of claim 1, wherein the housing includes a battery attachment portion, and the electrical contacts are exposed in the battery attachment portion.

3. The tool of claim 2, wherein the battery attachment portion includes a latch, and the latch includes a protrusion that projects inwardly into the battery attachment portion, and a latch handle operably coupled to the protrusion.

4. The tool of claim 3, wherein the protrusion is adapted to engage with a projection of the battery to removably couple the battery to the battery attachment portion.

5. The tool of claim 1, wherein the battery is adapted to provide 12V DC power.

6. The tool of claim 1, further comprising a controller assembly disposed in the housing and adapted to electrically couple to the battery.

7. The tool of claim 6, wherein the controller assembly includes a printed circuit board (PCB).

8. The tool of claim 7, wherein the PCB is electrically coupled between the battery and the motor.

9. A portable rescue tool with first and second jaws, the tool comprising:
   a housing including electrical contacts;
   a battery adapted to removably couple to the housing and electrically couple to the electrical contacts;
   a power adapter adapted to removably couple to the housing and electrically couple to the electrical contacts when the battery is removed from the housing, and supply power from an external power source;
   a motor disposed in the housing, the motor is adapted to receive power and provide output torque;
   a gear assembly disposed in the housing and operably coupled to the motor, the gear assembly is adapted to receive the output torque from the motor; and
   an actuator assembly operably coupled to the gear assembly and adapted to receive output torque from the gear assembly, and provide torque to operate the jaws.

10. The tool of claim 9, wherein the housing includes a battery attachment portion, and the electrical contacts are exposed in the battery attachment portion.

11. The tool of claim 10, wherein the battery attachment portion includes a latch adapted to removably couple the battery to the battery attachment portion, and the power adapter to the battery attachment portion when the battery is removed from the battery attachment portion.

12. The tool of claim 11, wherein the latch includes a protrusion that projects inwardly into the battery attachment portion, and a handle operably coupled to the protrusion.

13. The tool of claim 12, wherein the protrusion is adapted to engage with a projection of the battery or the power adapter.

14. The tool of claim 9, further comprising a controller assembly disposed in the housing.

15. The tool of claim 14, wherein the controller assembly includes a printed circuit board (PCB).

16. The tool of claim 15, wherein the PCB is electrically coupled between the motor and one of the battery and power adapter.

17. A portable rescue tool with first and second jaws, the tool comprising:

a housing;
a battery adapted to removably couple to the housing and provide power;
a motor disposed in the housing, the motor is adapted to receive power via the battery, and provide output torque;
a gear assembly disposed in the housing and operably coupled to the motor, the gear assembly is adapted to receive the output torque from the motor;
an actuator assembly operably coupled to the gear assembly and adapted to receive output torque from the gear assembly, and provide torque to operate the jaws; and
a remote control port disposed on the housing and adapted to removably receive and operably couple to a remote control to allow remote operation of the tool.

18. The tool of claim 17, further comprising a controller assembly disposed in the housing.

19. The tool of claim 18, wherein the controller assembly includes a printed circuit board (PCB).

20. The tool of claim 19, wherein the PCB is operably coupled to the remote control connection port and electrically coupled between the motor and the battery.

* * * * *